(12) United States Patent
Mokry et al.

(10) Patent No.: US 9,215,765 B1
(45) Date of Patent: Dec. 15, 2015

(54) SYSTEMS AND METHODS FOR LOW-POWER LAMP COMPATIBILITY WITH AN ELECTRONIC TRANSFORMER

(71) Applicant: Cirrus Logic, Inc., Austin, TX (US)

(72) Inventors: Wesley L. Mokry, Austin, TX (US); Michael A. Kost, Austin, TX (US); Eric Jerome King, Dripping Springs, TX (US)

(73) Assignee: Philips International, B.V., Eindhoven (NL)

( * ) Notice: Subject to any disclaimer, the term of this patent is extended or adjusted under 35 U.S.C. 154(b) by 172 days.

(21) Appl. No.: 13/889,926

(22) Filed: May 8, 2013

Related U.S. Application Data

(60) Provisional application No. 61/719,025, filed on Oct. 26, 2012.

(51) Int. Cl.
*H05B 37/00* (2006.01)
*H05B 39/00* (2006.01)
*H05B 33/08* (2006.01)
*H02M 7/217* (2006.01)

(52) U.S. Cl.
CPC ........... *H05B 33/0812* (2013.01); *H02M 7/217* (2013.01)

(58) Field of Classification Search
CPC .......... H05B 41/2855; H05B 41/2851; B23H 1/024; B23H 1/026; H02H 7/1227
USPC .............................................. 315/200 R, 307
See application file for complete search history.

(56) References Cited

U.S. PATENT DOCUMENTS

| | | | |
|---|---|---|---|
| 3,806,829 | A | 4/1974 | Duston et al. |
| 4,008,414 | A | 2/1977 | Agnew |
| 4,562,382 | A | 12/1985 | Elliott |
| 5,040,236 | A | 8/1991 | Costello |
| 5,089,753 | A | 2/1992 | Mattas |
| 5,416,387 | A | 5/1995 | Cuk et al. |

(Continued)

FOREIGN PATENT DOCUMENTS

| | | |
|---|---|---|
| EP | 2403120 A2 | 1/2012 |
| EP | 2590477 A1 | 5/2013 |

(Continued)

OTHER PUBLICATIONS

International Search Report and Written Opinion, International Patent Application No. PCT/US2013/071690, mailed Jun. 4, 2014, 13 pages.

(Continued)

*Primary Examiner* — Quan Tra
(74) *Attorney, Agent, or Firm* — Jackson Walker L.L.P.

(57) ABSTRACT

In accordance with embodiments of the present disclosure, a system and method for providing compatibility between a load having a reactive impedance during steady-state operation and a secondary winding of an electronic transformer driven by a leading-edge dimmer may include a first circuit and a second circuit. The first circuit may cause the load to have a substantially non-reactive impedance when the first circuit is enabled. The second circuit may enable the first circuit to cause the load to have the substantially non-reactive impedance during a duration of time following start-up of the electronic transformer and disable the first circuit after the duration such that the load has the reactive impedance during steady-state operation of the load.

12 Claims, 4 Drawing Sheets

(56) References Cited

U.S. PATENT DOCUMENTS

| | | | |
|---|---|---|---|
| 5,583,402 | A | 12/1996 | Moisin et al. |
| 5,650,694 | A | 7/1997 | Jayaraman et al. |
| 5,872,429 | A | 2/1999 | Xia et al. |
| 6,369,461 | B1 | 4/2002 | Jungreis et al. |
| 6,407,935 | B1 | 6/2002 | Chang et al. |
| 7,812,550 | B2 | 10/2010 | Harmgardt et al. |
| 8,067,902 | B2 | 11/2011 | Newman, Jr. et al. |
| 8,212,491 | B2 | 7/2012 | Kost et al. |
| 8,547,034 | B2 | 10/2013 | Melanson et al. |
| 8,653,759 | B2 * | 2/2014 | Vigh et al. .................. 315/310 |
| 8,664,883 | B2 | 3/2014 | Hiramatu et al. |
| 8,698,483 | B2 | 4/2014 | Riesebosch |
| 8,716,957 | B2 | 5/2014 | Melanson et al. |
| 8,723,431 | B2 * | 5/2014 | Deppe et al. ............ 315/185 R |
| 8,742,674 | B2 | 6/2014 | Shteynberg et al. |
| 8,928,243 | B2 | 1/2015 | Potter et al. |
| 8,933,648 | B1 | 1/2015 | Putman et al. |
| 9,072,125 | B2 | 6/2015 | King et al. |
| 9,167,664 | B2 | 10/2015 | Xie et al. |
| 2003/0127994 | A1 | 7/2003 | Patchornik et al. |
| 2003/0151931 | A1 | 8/2003 | Kohno |
| 2005/0174162 | A1 | 8/2005 | Cheng et al. |
| 2005/0249667 | A1 | 11/2005 | Tuszynski et al. |
| 2006/0147371 | A1 | 7/2006 | Tuszynski et al. |
| 2007/0040516 | A1 | 2/2007 | Chen |
| 2007/0076459 | A1 | 4/2007 | Limpkin |
| 2007/0262654 | A1 | 11/2007 | Mosebrook et al. |
| 2007/0285028 | A1 | 12/2007 | Tsinker et al. |
| 2008/0013343 | A1 | 1/2008 | Matthews |
| 2008/0018261 | A1 | 1/2008 | Kastner |
| 2008/0024074 | A1 | 1/2008 | Mosebrook et al. |
| 2008/0119421 | A1 | 5/2008 | Tuszynski et al. |
| 2008/0224636 | A1 | 9/2008 | Melanson |
| 2009/0184662 | A1 | 7/2009 | Given et al. |
| 2009/0295292 | A1 | 12/2009 | Harmgardt et al. |
| 2010/0013409 | A1 | 1/2010 | Quek et al. |
| 2010/0141178 | A1 | 6/2010 | Negrete et al. |
| 2010/0164406 | A1 | 7/2010 | Kost et al. |
| 2010/0225251 | A1 * | 9/2010 | Maruyama ................. 315/307 |
| 2010/0244726 | A1 | 9/2010 | Melanson |
| 2011/0012530 | A1 | 1/2011 | Zheng et al. |
| 2011/0115400 | A1 | 5/2011 | Harrison et al. |
| 2011/0121751 | A1 | 5/2011 | Harrison et al. |
| 2011/0121752 | A1 | 5/2011 | Newman, Jr. et al. |
| 2011/0121754 | A1 | 5/2011 | Shteynberg et al. |
| 2011/0127925 | A1 | 6/2011 | Huang et al. |
| 2011/0199017 | A1 | 8/2011 | Dilger |
| 2011/0210674 | A1 | 9/2011 | Melanson |
| 2011/0266968 | A1 | 11/2011 | Bordin et al. |
| 2011/0309759 | A1 | 12/2011 | Shteynberg et al. |
| 2012/0025729 | A1 | 2/2012 | Melanson et al. |
| 2012/0043913 | A1 | 2/2012 | Melanson |
| 2012/0049752 | A1 | 3/2012 | King et al. |
| 2012/0098454 | A1 | 4/2012 | Grotkowski et al. |
| 2012/0106216 | A1 | 5/2012 | Tzinker et al. |
| 2012/0112638 | A1 | 5/2012 | Melanson et al. |
| 2012/0112648 | A1 | 5/2012 | Hariharan |
| 2012/0119669 | A1 | 5/2012 | Melanson et al. |
| 2012/0139431 | A1 | 6/2012 | Thompson |
| 2012/0146546 | A1 | 6/2012 | Hu et al. |
| 2012/0169240 | A1 | 7/2012 | Macfarlane |
| 2012/0229041 | A1 | 9/2012 | Saes et al. |
| 2012/0230073 | A1 | 9/2012 | Newman et al. |
| 2012/0242238 | A1 | 9/2012 | Chen et al. |
| 2012/0286684 | A1 | 11/2012 | Melanson et al. |
| 2012/0286696 | A1 | 11/2012 | Ghanem |
| 2012/0286826 | A1 | 11/2012 | King et al. |
| 2012/0299501 | A1 | 11/2012 | Kost et al. |
| 2013/0002163 | A1 | 1/2013 | He et al. |
| 2013/0113458 | A1 | 5/2013 | Riesebosch |
| 2013/0278159 | A1 * | 10/2013 | Del Carmen et al. ..... 315/200 R |
| 2014/0009078 | A1 | 1/2014 | Xie et al. |
| 2014/0009079 | A1 | 1/2014 | Xie et al. |
| 2014/0009082 | A1 | 1/2014 | King et al. |
| 2014/0028214 | A1 | 1/2014 | Mazumdar et al. |
| 2014/0167639 | A1 | 6/2014 | King et al. |
| 2014/0167652 | A1 | 6/2014 | King et al. |
| 2014/0239832 | A1 | 8/2014 | Shteynberg et al. |
| 2014/0333205 | A1 | 11/2014 | Kost et al. |
| 2015/0061536 | A1 | 3/2015 | Xie et al. |

FOREIGN PATENT DOCUMENTS

| | | |
|---|---|---|
| WO | 2011063205 A1 | 5/2011 |
| WO | 2011111005 A1 | 9/2011 |
| WO | 2013072793 A1 | 5/2013 |
| WO | 2013090904 A1 | 6/2013 |

OTHER PUBLICATIONS

International Search Report and Written Opinion, International Patent Application No. PCT/US2013/047777, mailed Jun. 26, 2014, 21 pages.

International Search Report and Written Opinion, International Patent Application No. PCT/US2013/047844, mailed Jul. 23, 2014, 14 pages.

International Search Report and Written Opinion, International Patent Application No. PCT/US2014/032182, mailed Jul. 24, 2014, 10 pages.

International Search Report and Written Opinion, International Patent Application No. PCT/US2014/037864, mailed Sep. 29, 2014, 8 pages.

International Search Report and Written Opinion, International Patent Application No. PCT/US2015/035052, mailed Oct. 21, 2015, 11 pages.

* cited by examiner

SYSTEMS AND METHODS FOR LOW-POWER LAMP COMPATIBILITY WITH AN ELECTRONIC TRANSFORMER

RELATED APPLICATIONS

The present disclosure claims priority to U.S. Provisional Patent Application Ser. No. 61/719,025, filed Oct. 26, 2012, which is incorporated by reference herein in its entirety.

FIELD OF DISCLOSURE

The present disclosure relates in general to the field of electronics, and more specifically to systems and methods for ensuring compatibility between one or more low-power lamps and the power infrastructure to which they are coupled.

BACKGROUND

Customers of lighting are increasingly choosing low-power lighting to meet their lighting needs. Typically, such low-power lighting employs halogen light bulbs, light-emitting diode light bulbs, compact fluorescent light bulbs, or other types of light bulbs or lamp assemblies that produce light with intensity on par with that of traditional incandescent light bulbs, but with significantly less power consumption. However, many of such light bulbs or lamp assemblies operate using a voltage (e.g., 12 volts) much less than that typically provided by traditional power infrastructures. For example, in the United States, public utilities generally provide electricity in the form of a 60-Hertz sinusoid with a magnitude of 120 volts. Thus, for low-power lamp assemblies to properly operate in the existing power infrastructure, a voltage transformer must be interposed between the public electricity source and the lamp assembly.

Transformers present in a power infrastructure may include magnetic or electronic transformers. A magnetic transformer typically comprises two coils of conductive material (e.g., copper) each wrapped around a core of material having a high magnetic permeability (e.g., iron) such that magnetic flux passes through both coils. In operation, an electric current in the first coil may produce a changing magnetic field in the core, such that the changing magnetic field induces a voltage across the ends of the secondary winding via electromagnetic induction. Thus, a magnetic transformer may step voltage levels up or down while providing electrical isolation in a circuit between components coupled to the primary winding and components coupled to the secondary winding.

On the other hand, an electronic transformer is a device which behaves in the same manner as a conventional magnetic transformer in that it steps voltage levels up or down while providing isolation and can accommodate load current of any power factor. An electronic transformer generally includes power switches which convert a low-frequency (e.g., direct current to 400 Hertz) voltage wave to a high-frequency voltage wave (e.g., in the order of 10,000 Hertz). A comparatively small magnetic transformer may be coupled to such power switches and thus provides the voltage level transformation and isolation functions of the conventional magnetic transformer.

FIG. 1 depicts a lighting system 101 that includes an electronic transformer 122 and a lamp assembly 142. Such a system may be used, for example, to transform a high voltage (e.g., 110V, 220 V) to a low voltage (e.g., 12 V) for use with a halogen lamp (e.g., an MR16 halogen lamp). In some instances, such a transformer 122 may be present in a lighting fixture configured to receive a lamp assembly 142, wherein such lamp assembly 142 includes a source of light (e.g., LEDs 152) for providing illumination. Generally, a transformer 122 designed to receive an incandescent or halogen lamp assembly "expects" a linear load (e.g., one which has a primarily constant impedance, in which current varies in a linear fashion with the voltage applied to the load). However, when a lamp that has a non-linear operating mode (e.g., including but not limited to a light-emitting diode, or LED, lamp) is used with an electronic transformer designed to receive a linear load, the electronic transformer may not function properly, due to the fact that the non-linear load may present widely varying impedances for different time durations.

Furthermore, an electronic transformer 122 may have a power rating range, such as from a minimum power rating to a maximum power rating (e.g., zero watts to 60 watts). When a non-linear load is coupled to electronic transformer 122, the varying non-linear impedance may consume power that falls outside the power rating range.

Referring to FIG. 1, lighting system 101 may receive an AC supply voltage $V_{SUPPLY}$ from voltage supply 104. The supply voltage $V_{SUPPLY}$ is, for example, a nominally 60 Hz/110 V line voltage in the United States of America or a nominally 50 Hz/220 V line voltage in Europe. Electronic transformer 122 may receive the AC supply voltage $V_{SUPPLY}$ at its input where it is rectified by a full-bridge rectifier formed by diodes 124. As voltage $V_{SUPPLY}$ increases in magnitude, voltage on capacitor 126 may increase to a point where diac 128 will turn on (the diac break-over voltage), thus also turning on transistor 129. Once transistor 129 is on, capacitor 126 may be discharged and oscillation will start due to the self-resonance of switching transformer 130, which includes a primary winding ($T_{2a}$) and two secondary windings ($T_{2b}$ and $T_{2c}$). Switching transformer 130 may be a saturable core transformer, and if the impedance of lamp assembly 142 is too low, the core of switching transformer 130 may saturate causing the voltage across the base-emitter junction of transistor 129 to go to zero, thus turning off transistor 129. Thus, the load presented to transformer 122 by lamp 142 must be low enough that the current through switching transformer 130 at the break-over voltage of diac 128 will saturate switching transformer 130, causing it to oscillate.

Lamp assembly 142 may receive the AC supply voltage $V_S$ at its input where it is rectified by a full-bridge rectifier formed by diodes 144. Such voltage may charge a capacitor 146, thus providing a direct current voltage for linear regulator 148. Linear regulator 148 may be operable to provide a regulated voltage to LED driver 150, which itself may include circuitry for driving an output voltage or current to LEDs 152, thus generating photonic energy. During start-up of electronic transformer 122, capacitor 146 needs to charge to a voltage sufficient to allow linear regulator 148 and LED driver 150 to begin steady-state operation. Because capacitor 146 is the primary load to electronic transformer 122 while linear regulator 148 and LED driver 150 start-up, a non-linear load is provided to electronic transformer 122. Upon start-up of electronic transformer 122, capacitor 146 initially provides a low impedance to electronic transformer 122, and electronic transformer 122 may begin oscillating. However, when capacitor 146 reaches a voltage equal to a diode threshold voltage below the peak voltage value from electronic transformer 122, capacitor 146 then presents a high impedance to electronic transformer 122, and electronic transformer 122 may stop oscillation. If the voltage across capacitor 146 is less than the steady-state voltage of linear regulator 148 and LED driver 150, then lamp assembly 142 may fail to present a linear load to electronic transformer 122.

SUMMARY

In accordance with the teachings of the present disclosure, certain disadvantages and problems associated with ensuring compatibility of a low-power lamp with a transformer may be reduced or eliminated.

In accordance with embodiments of the present disclosure, an apparatus for providing compatibility between a load having a reactive impedance during steady-state operation and a secondary winding of an electronic transformer driven by a leading-edge dimmer may include a first circuit and a second circuit. The first circuit may cause the load to have a substantially non-reactive impedance when the first circuit is enabled. The second circuit may enable the first circuit to cause the load to have the substantially non-reactive impedance during a duration of time following start-up of the electronic transformer and disable the first circuit after the duration such that the load has the reactive impedance during steady-state operation of the load.

In accordance with these and other embodiments of the present disclosure, a method for providing compatibility between a load having a reactive impedance during steady-state operation and a secondary winding of an electronic transformer driven by a leading-edge dimmer may include presenting the load to the electronic transformer as a substantially non-reactive impedance during a duration of time following start-up of the electronic transformer and presenting the load to the electronic transformer such that the load has the reactive impedance after the duration for steady-state operation of the load.

Technical advantages of the present disclosure may be readily apparent to one of ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
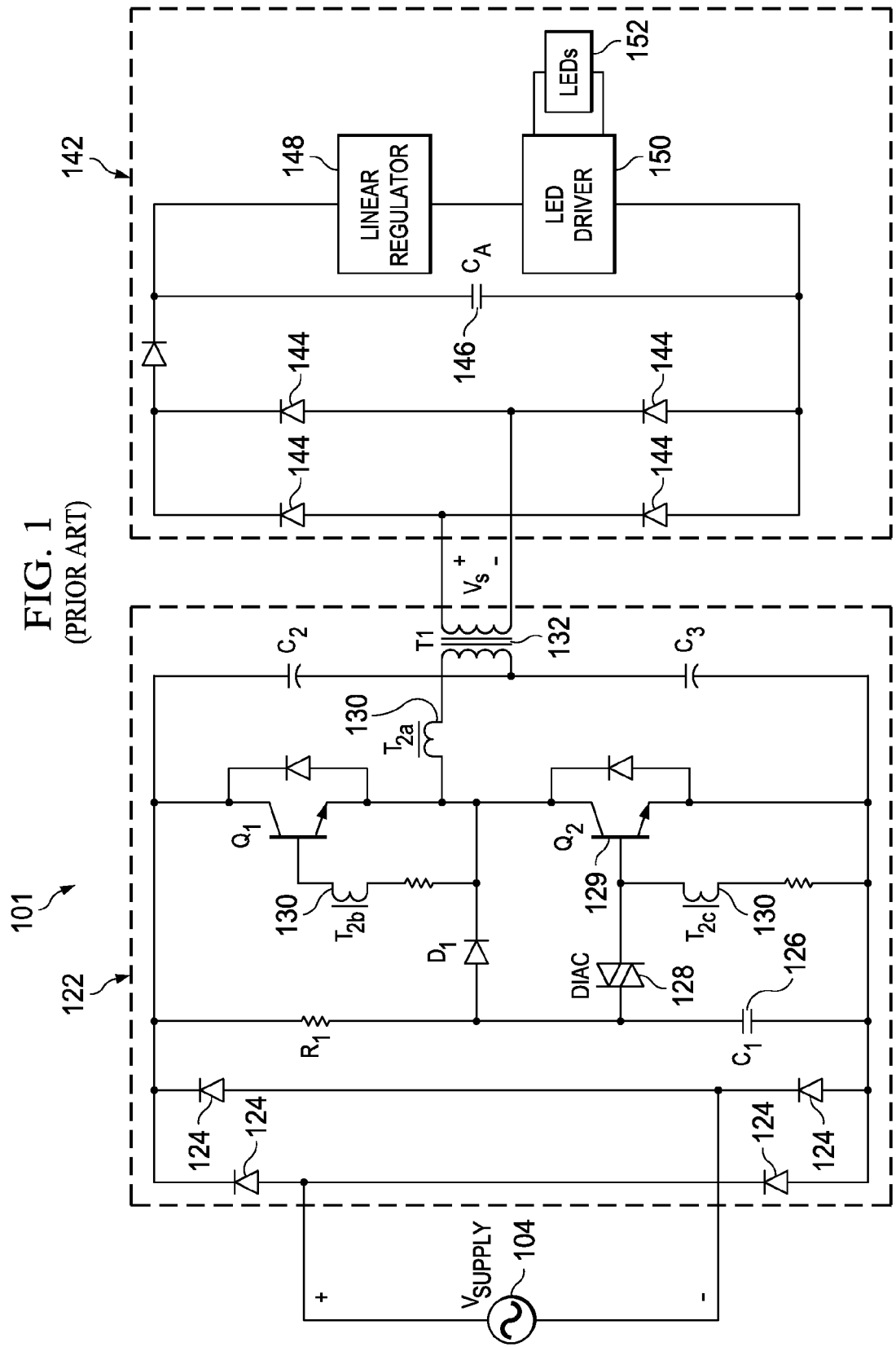
FIG. 1 illustrates a lighting system that includes an electronic transformer, as is known in the art.
Figure 2:
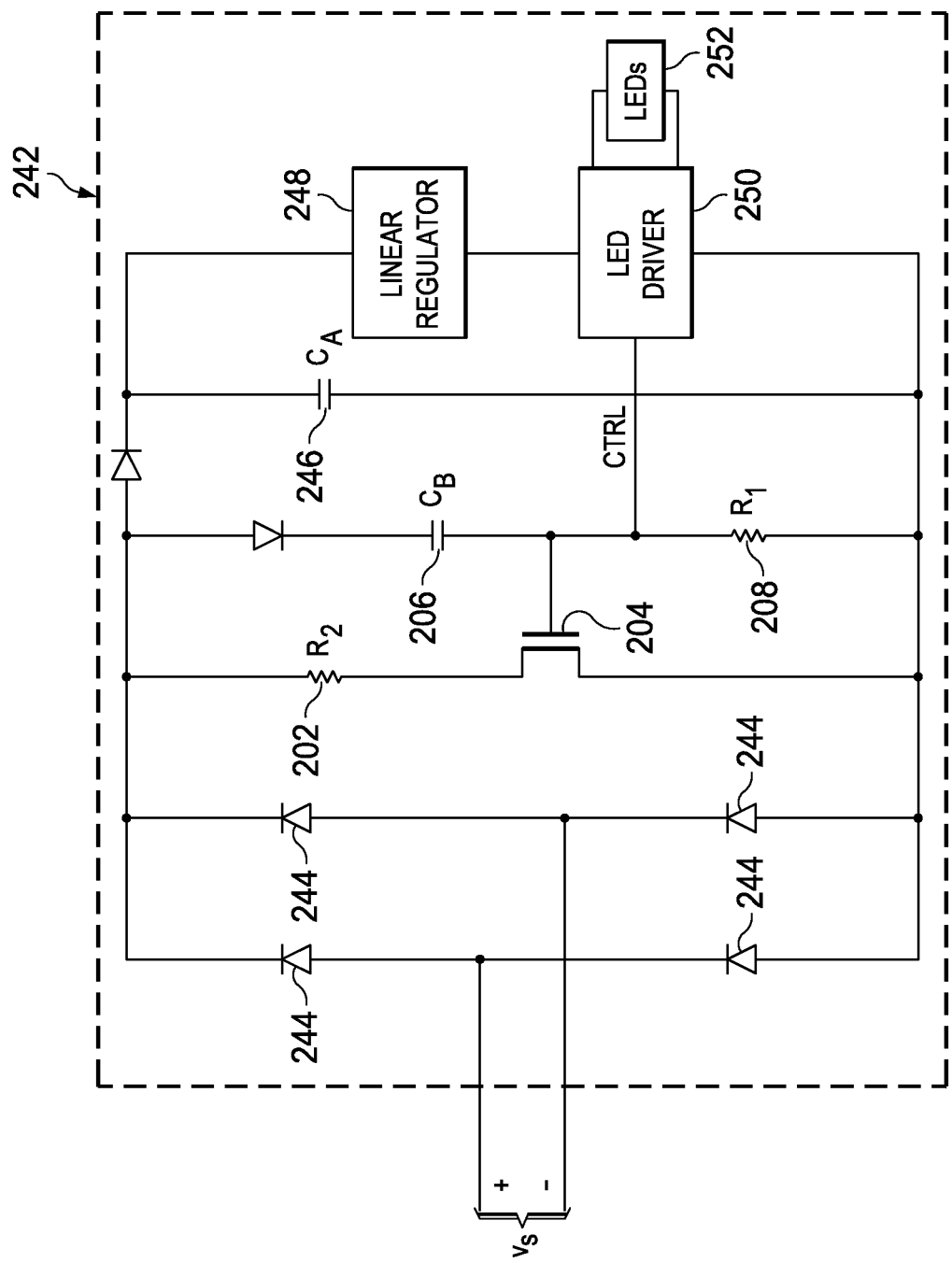
FIG. 2 illustrates an example lamp assembly including circuitry for providing compatibility between the lamp assembly and other elements of a lighting system, in accordance with embodiments of the present disclosure.

FIG. 2 illustrates an example lamp assembly 242 including circuitry for providing compatibility between lamp assembly 242 and other elements of a lighting system (e.g., an electronic transformer), in accordance with embodiments of the present disclosure. As shown in FIG. 2, lamp assembly 242 may comprise a bridge rectifier formed by diodes 244. In addition, lamp assembly 242 may comprise a first circuit including a series combination of a resistor 202 and a switch 204 implemented as an n-type metal-oxide-semiconductor field-effect transistor in the embodiments represented by FIG. 2. As shown in FIG. 2, such first circuit may be configured such that it is in parallel with a load comprising linear regulator 248 and LED driver 250 and further configured such that the voltage $v_S$ as rectified by the bridge rectifier formed by diodes 244 is applied across the first circuit (e.g., opposite nodes of the series combination of resistor 202 and switch 204 are coupled to the output of the bridge rectifier).

Lamp assembly 242 may also comprise a second circuit including a timer circuit. In the embodiments represented by FIG. 2, such timer circuit may include a series combination of capacitor 206 and resistor 208. As explained in greater detail below, capacitor 206 and resistor 208 may have a time constant defined by their respective impedances $C_B$ and $R_1$ and may each be coupled to a gate terminal of switch 204 such that the first circuit is enabled and disabled in accordance with such time constant.

Lamp assembly 242 may further include charging capacitor 246 which, during operation of lamp assembly 242, charges as a result of energy transferred from the input of lamp assembly 242 to a direct current voltage for powering linear regulator 248. Linear regulator 248 may comprise any system, device, or apparatus for providing a regulated, direct current voltage to LED driver 250. In turn, LED driver 250 may comprise any system, device, or apparatus for driving an output voltage to light-emitting diodes (LEDs) 252 or another light source. Together, capacitor 246, linear regulator 248, and LED driver 250 may, in the absence of the first circuit and the second circuit, present as a load having a non-linear reactive impedance to components of a lighting system coupled at the input terminals of lamp assembly 242, which, as described in the "Background" section above, may lead to improper or undesirable operation of lamp assembly 242.

In operation, lamp assembly 242 may be coupled to a lighting system, including without limitation a lighting system having an electronic transformer (e.g., electronic transformer 122) such that a secondary winding of the electronic transformer generates a voltage $v_S$ applied to the input terminals of lamp assembly 242, which may then be rectified by the bridge rectifier formed by diodes 244. During start-up of lamp assembly 242 (e.g., right after when lamp assembly 242 is powered on), the second circuit may be configured to (e.g., capacitors 206 and 208 may be coupled to each other, the first circuit, and the electronic transformer in order to) enable the first circuit (e.g., by closing switch 204) such that lamp assembly 242 presents a substantially non-reactive linear impedance (e.g., the resistance $R_2$ of resistor 202) to components (e.g., an electronic transformer) of a lighting system coupled at the input terminals of lamp assembly 242 during a duration of time (e.g., defined by the time constant of the second circuit), and then disable the first circuit (e.g., by opening switch 204) after the duration such that the reactive load of capacitor 246, linear regulator 248, and LED driver 250 is presented at the input terminals of lamp assembly 242. In addition or alternatively, as depicted in FIG. 2, LED driver 250 may also include circuitry capable of driving a control signal CTRL (e.g., to selectively close or open switch 204) for disabling the first circuit responsive to a determination that the LED driver 250 has received sufficient electrical energy in order to drive LEDs 252.

Figure 3:
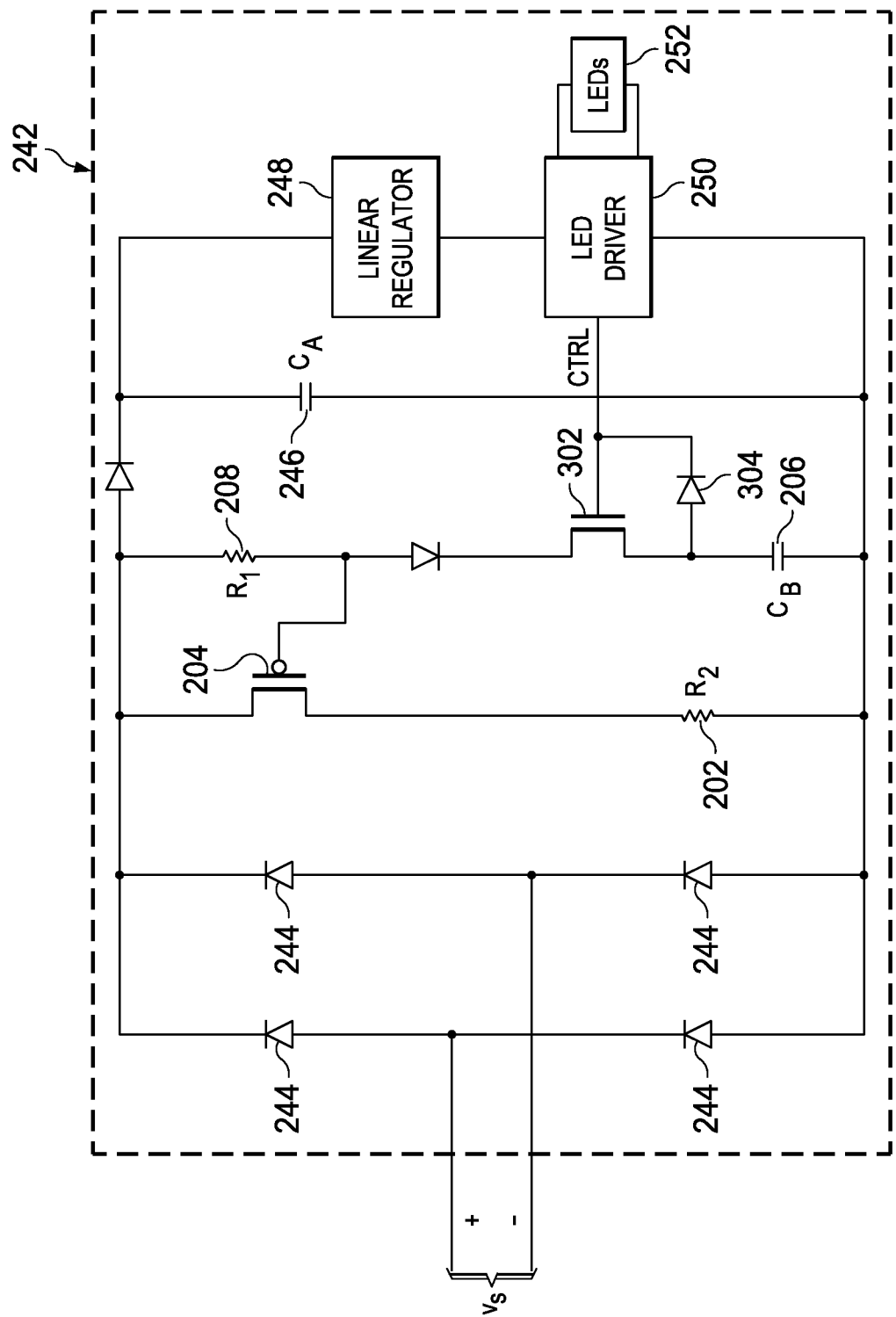
FIG. 3 illustrates another example lamp assembly including circuitry for providing compatibility between the lamp assembly and other elements of a lighting system, in accordance with embodiments of the present disclosure.

FIG. 3 illustrates another example lamp assembly 242 including circuitry for providing compatibility between lamp assembly 242 and other elements of a lighting system, in accordance with embodiments of the present disclosure. In fact, lamp assembly 242 depicted in FIG. 3 is identical in structure, functionality, and principle of operation to lamp assembly 242 depicted in FIG. 2, except that: (i) switch 204 is implemented as a p-type metal-oxide-semiconductor field-effect transistor; (ii) the relative positions of resistor 202 and switch 204 forming the first circuit are swapped; (iii) the relative positions of capacitor 206 and resistor 208 forming the second circuit are swapped; (iv) control signal CTRL drives a control circuit comprising switch 302 and diode 304, such that LED driver 250 may drive control signal CTRL from a high voltage to a low voltage responsive to a determination that the LED driver 250 has received sufficient electrical energy in order to drive LEDs 252, thus disabling the first circuit of resistor 202 and switch 204.

Figure 4:
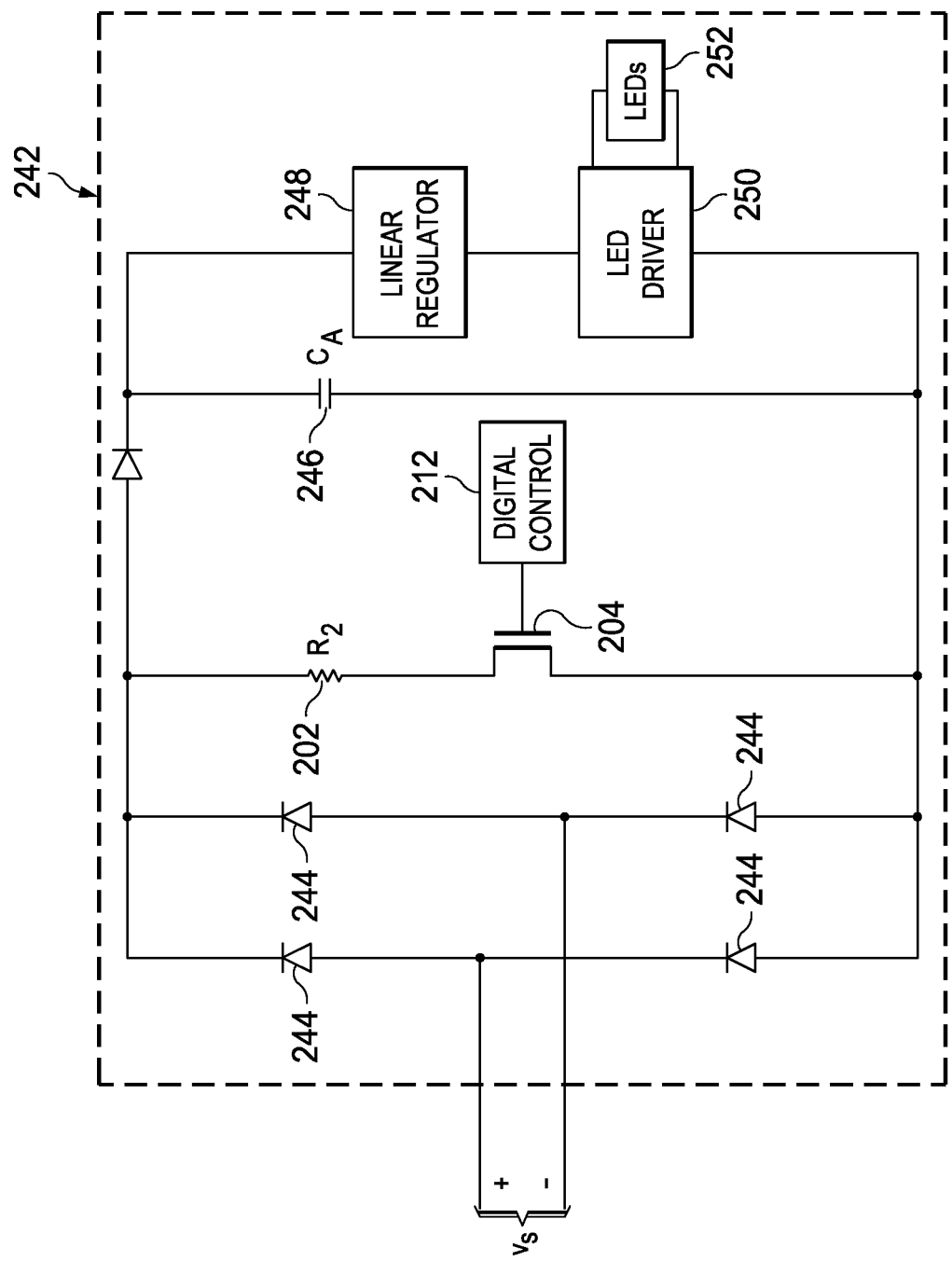
FIG. 4 illustrates yet another example lamp assembly including circuitry for providing compatibility between the lamp assembly and other elements of a lighting system, in accordance with embodiments of the present disclosure.

FIG. 4 illustrates yet another example lamp assembly 242 including circuitry for providing compatibility between lamp assembly 242 and other elements of a lighting system, in accordance with embodiments of the present disclosure. In fact, lamp assembly 242 depicted in FIG. 4 is identical in structure, functionality, and principle of operation to lamp assembly 242 depicted in FIG. 2, except that the second circuit, instead of comprising a series combination of capacitor 206 and resistor 208, comprises a digital counter 212 configured to enable the first circuit (e.g., close switch 204) during a duration after start-up of lamp assembly 242, after which it disables the first circuit (e.g., opens switch 204).

As used herein, when two or more elements are referred to as "coupled" to one another, such term indicates that such two or more elements are in electronic communication whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An apparatus for providing compatibility between a load having a reactive impedance during steady-state operation and a secondary winding of an electronic transformer driven by a leading-edge dimmer, comprising:
   a first circuit for causing the load to have a substantially non-reactive impedance when the first circuit is enabled;
   a second circuit for enabling the first circuit to cause the load to have the substantially non-reactive impedance during a duration of time following start-up of the electronic transformer and for disabling the first circuit after the duration such that the load has the reactive impedance during steady-state operation of the load; and
   the load comprising a driving circuit coupled to the first circuit, wherein the driving circuit is configured to drive a light source, wherein the driving circuit is configured to disable the first circuit responsive to a determination that the driving circuit has received sufficient electrical energy from the electronic transformer in order to drive the light source.

2. The apparatus of claim 1, wherein the first circuit comprises a series combination of a resistor in series with a switch, wherein the switch is configured to be closed during the duration of time and open after the duration.

3. The apparatus of claim 2, wherein the switch comprises an n-type metal-oxide-semiconductor field-effect transistor.

4. The apparatus of claim 2, wherein the series combination is in parallel with the load.

5. The apparatus of claim 2, wherein the series combination is configured to be coupled to the secondary winding.

6. The apparatus of claim 5, wherein the series combination is configured to be coupled to the secondary winding via a bridge rectifier.

7. The apparatus of claim 1, wherein the second circuit comprises a timer circuit.

8. The apparatus of claim 7, wherein the timer circuit comprises a series combination of a resistor and a capacitor, wherein the resistor and the capacitor are coupled to each other, the electronic transformer, and the first circuit such that the second circuit enables the first circuit to cause the load to have the substantially non-reactive impedance during the duration and disables the first circuit after the duration such that the load has the reactive impedance during steady-state operation of the load.

9. The apparatus of claim 8, wherein the resistor and the capacitor have a time constant, and the duration is based on the time constant.

10. The apparatus of claim 1, wherein the light source comprises one or more light-emitting diodes.

11. A method for providing compatibility between a load having a reactive impedance during steady-state operation and a secondary winding of an electronic transformer driven by a leading-edge dimmer, comprising:
    presenting the load to the electronic transformer as a substantially non-reactive impedance during a duration of time following start-up of the electronic transformer;
    presenting the load to the electronic transformer such that the load has the reactive impedance after the duration for steady-state operation of the load; and
    presenting the load to the electronic transformer such that the load has the reactive impedance responsive to a driving circuit integral the load for driving a light source indicating that the driving circuit has received sufficient electrical energy from the electronic transformer in order to drive the light source.

12. The method of claim 11, wherein the light source comprises one or more light-emitting diodes.

* * * * *